(12) United States Patent
Kim et al.

(10) Patent No.: US 7,966,744 B2
(45) Date of Patent: Jun. 28, 2011

(54) FOOD WASTE TREATMENT APPARATUS USING MICROWAVE

(76) Inventors: Soo Dong Kim, Busan (KR); Sung Hwa Kim, Busan (KR)

( * ) Notice: Subject to any disclaimer, the term of this patent is extended or adjusted under 35 U.S.C. 154(b) by 329 days.

(21) Appl. No.: 11/912,882

(22) PCT Filed: Mar. 24, 2006

(86) PCT No.: PCT/KR2006/001085
§ 371 (c)(1),
(2), (4) Date: Oct. 26, 2007

(87) PCT Pub. No.: WO2006/115330
PCT Pub. Date: Nov. 2, 2006

(65) Prior Publication Data
US 2008/0184918 A1 Aug. 7, 2008

(30) Foreign Application Priority Data

Apr. 28, 2005 (KR) .......................... 10-2005-0035684
Oct. 25, 2005 (KR) .......................... 10-2005-0100834

(51) Int. Cl.
*F26B 3/34* (2006.01)
*F26B 7/00* (2006.01)
*F26B 19/00* (2006.01)
*F26B 25/06* (2006.01)

(52) U.S. Cl. ................ 34/259; 34/264; 34/265; 34/384; 34/217

(58) Field of Classification Search .................... 34/259, 34/255, 258, 262, 263, 264, 265, 383, 384, 34/386, 424, 442, 616, 217, 500, 207; 219/388, 219/751, 753, 745, 749; 426/241, 242, 245; 99/360, 362; 198/370.11, 493, 701, 702
See application file for complete search history.

(56) References Cited

U.S. PATENT DOCUMENTS

| 4,092,513 | A | * | 5/1978 | Rasmussen .................... 219/751 |
| 4,194,300 | A | * | 3/1980 | Swanson et al. ................. 34/217 |
| 4,714,811 | A | * | 12/1987 | Gerling et al. ................ 219/751 |
| 6,768,087 | B2 | | 7/2004 | Kikuchi |

FOREIGN PATENT DOCUMENTS

JP         08309749 A  * 11/1996
(Continued)

OTHER PUBLICATIONS

PCT International Search Reports, PCT/KR2006/001085.

*Primary Examiner* — Kenneth B Rinehart
*Assistant Examiner* — Corey Hall
(74) *Attorney, Agent, or Firm* — Park & Associates IP Law, P.C.

(57) ABSTRACT

The present invention relates to a food waste treatment apparatus that can effectively dispose food waste containing a large amount of water, rapidly dry food waste using microwaves, and remove odors and vapors generating during the drying process, thereby discharging clean air. The food waste treatment apparatus comprises a pulverizer (10) for pulverizing food waste, an endless track (20) for transferring food waste, a plurality of containers (30) installed on the upper surface of the endless track (20) for storing pulverized food waste, and a microwave dryer installed above the endless track for drying the pulverized food waste by making microwaves pass through the endless track in a direction perpendicular to the moving direction of the endless track (20).

6 Claims, 5 Drawing Sheets

FOREIGN PATENT DOCUMENTS

| | | |
|---|---|---|
| JP | 09-255101 A | 9/1997 |
| JP | 10309433 A * | 11/1998 |
| JP | 2001-300472 A | 11/2001 |
| JP | 2002096049 A * | 4/2002 |
| JP | 2004-066053 A | 3/2004 |
| KR | 1999-0060800 A | 7/1999 |

* cited by examiner

FOOD WASTE TREATMENT APPARATUS USING MICROWAVE

REFERENCE TO RELATED APPLICATIONS

This application is a U.S. national phase application of international application PCT/KR2006/001085 filed Mar. 24, 2006 which designated the United States and claims priority of Korean Patent Applications No. 10-2005-0035684, filed on Apr. 28, 2005, and No. 10-2005-0100834, filed on Oct. 25, 2005, the entire contents of which are incorporated herein by reference.

FIELD OF THE INVENTION

The present invention relates to a food waste treatment apparatus for disposing, drying, and recycling food waste as compost, and a nature-friendly food waste treatment apparatus for drying food waste using microwaves, capable of enhancing drying efficiency, and removing odor and vapors generated during the drying process using ozone and a variety of filters.

BACKGROUND OF THE INVENTION

Generally, food waste treatment is very difficult. That is, it is difficult to incinerate food waste or to bury the food waste in landfills because it contains a large amount of water. Further, standards for food waste treatment are becoming strict.

An example thereof is the regulation on food waste sorting and discharge. According to this regulation, food waste must be separated from other waste and discharged using a separate food waste bag. Even in this case, since the food waste contains a large amount of water, it easily decomposes in a food waste bag, thereby causing odor and polluting the surroundings with leachate.

In the ideal food waste discharge state, the food waste contains almost no moisture. However, it is difficult to completely dehydrate food waste using recent technologies.

Further, even though food waste contains many valuable contents worth recycling, the food waste is generally buried as it is because it is very difficult to treat and separate the valuable content from the food waste. That is, although the food waste can be used as feedstuff for animals or as compost after treatment that includes steps of pulverizing, drying, and mixing the food waste with other material, the food waste is generally discarded without being reused.

Accordingly, in order to reuse the food waste from houses and restaurants, the food waste must be discharged in a dehydrated state.

In consideration of the above problems, several kinds of food waste treatment apparatus have been developed.

One example of a conventional food waste dehydration apparatus is disclosed in Korean Patent Application No. 10-1997-0081044, and uses microwaves. The food waste dehydration apparatus includes a dry compartment having a space in which food waste can be stored, pulverized and dried, a rotating axis installed in the dry compartment, a mixing blade rotating along with the rotating axis, and a magnetron for heating food waste in the dry compartment. However, this apparatus has a disadvantage in that it takes a long time to dry food waste and it cannot dry food waste continuously.

A further dehydration apparatus entitled "a coating liquid drying apparatus using microwaves" is disclosed in a Korean patent application assigned Application No. 10-2000-0001881.

Figure 1:
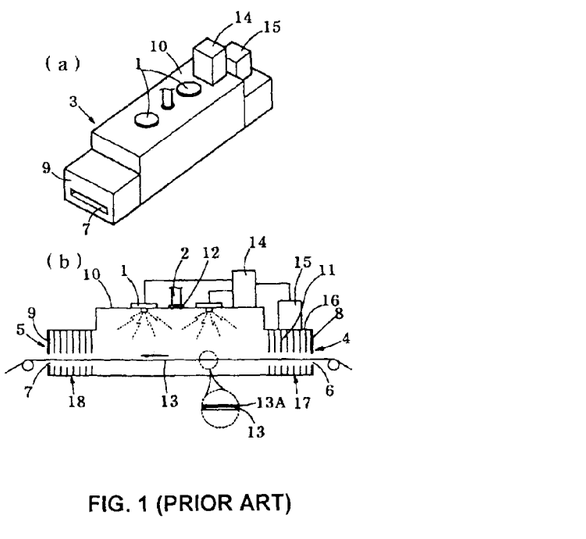
FIG. 1 is a perspective view and a sectional view illustrating a coating liquid drying apparatus using microwaves according to the conventional art.

FIG. 1 is a perspective view and a sectional view illustrating the structure of the coating liquid drying apparatus using microwaves according to the conventional art. The apparatus is installed on a moving path of an object to be coated in coating equipment for continuously forming coating layers on the surface of an object, and comprises a box-type housing 3, at least one magnetron 1 installed on the housing 3 for radiating microwaves into the housing 3, a power supply unit 14 and a controller 15 for driving and controlling the operation of the magnetron 1 installed outside the housing 3, a pull-in unit 17 and a pull-out unit 18 installed inside and outside an entrance of the housing 3 and having a microwaves shielding film 11 therein, and an air ventilation fan 12 and an air ventilation pipe for exhausting vapors and volatile solvents from coating liquid when drying the coating liquid.

The coating liquid drying apparatus according to the conventional art radiates microwaves on the coating liquid like a flashlight, so that there is a dead zone in which microwaves do not reach the object to be dried, and thereby it has low drying efficiency. Accordingly, it is difficult to dry food waste containing a large amount of water.

SUMMARY OF THE INVENTION

Accordingly, the present invention has been devised in consideration of the aforementioned problems and situations, and it is an object of the present invention to provide a nature-friendly food waste treatment apparatus using microwaves, capable of continuously supplying pulverized food waste on an endless track, capable of eliminating odors, and having enhanced drying efficiency.

In order to achieve the above objects and advantages, according to one aspect of the present invention, there is provided a food waste treatment apparatus using microwaves, comprising a pulverizer for pulverizing food waste, a quantitative discharger for discharging the pulverized food waste at regular discharge rates using a pump, a plurality of containers installed on an endless track for storing and transferring the pulverized food waste discharged from the quantitative discharger, a microwave dryer installed above the container for drying the pulverized food waste in a manner such that microwaves are created by a magnetron and are reflected in a direction perpendicular to a horizontal direction which is a moving direction of the containers, and a post-treatment unit connected to a side of the microwave dryer for removing odors and vapors.

The microwave dryer may comprise a magnetron for creating microwaves, and a reflection means for reflecting the microwaves incident in a horizontal direction to direct the microwaves in a vertical downward direction, the reflection means having a fixed plate inclined at 45 degrees with respect to the horizon direction and rotated by being connected to a step motor.

The reflection means may comprise two reflection means having different sizes.

The reflection means may comprise two reflection means having different sizes whose ratio is 3:2.

The microwave dryer may have a tunnel-type housing, three reflection means installed in the housing, and three magnetrons corresponding to respective reflection means.

The housing may have respective shielding doors at an entrance side and an exit side thereof, thereby shielding the microwaves and preventing the microwaves from leakage.

The post-treatment unit may comprise an ozone generator, for supplying ozone to the odors and a variety of filters.

The food waste treatment apparatus may further comprise a rotating brush installed under the endless track for removing residue sticking to an inner surface of the container.

According to a further aspect of the present invention, there is provided a food waste treatment apparatus using microwaves, comprising a pulverizer for pulverizing food waste to a mash form and discharging in a downward direction, an endless track, installed under the pulverizer, moving in a continuous manner, and being made of material through which microwaves pass, for transferring pulverized food waste, a reflection plate installed in a space provided by the endless track, in a manner such that the reflection plate is distanced from the endless track, a microwave dryer installed above the endless track for radiating microwaves created by a magnetron in a downward direction, and a post-treatment unit connected to the microwave dryer for removing odors and vapors.

The food waste treatment apparatus may further comprise a rotating feeder disposed between the pulverizer and the endless track for supplying pulverized food waste on a surface of the endless track.

The reflection plate may have a plurality of bars arranged in a length direction and coupled to each other on a surface thereof.

The microwave dryer may comprise a chamber installed on a surface of the endless track and connected to the reflection plate, having an empty space therein, a plurality of magnetrons installed above the chamber, and a reflection inducing body installed in the chamber at an upper part of the chamber, and installed between the magnetrons in a length direction, the reflection inducing body having a structure in which a thickness thereof becomes smaller in a downward direction.

The endless track may be coated with silicon.

The pulverizer may comprise a cylindrical casing having an open upper end and an open lower end, a pulverizing plate coupled to the lower end of the cylindrical casing, and having a plurality of depressions arranged in a radial manner on a first portion of an upper surface thereof, and having a plurality of through holes at a second portion other than the first portion, and a pulverizing rotary unit coupled to the pulverizing plate and installed above the pulverizing plate, and having a plurality of pulverizing cutters, each protruding from an upper surface thereof and being defined by a plurality of divisional depressions.

The food waste treatment apparatus may further comprise a screen mesh disposed on an upper surface of the second portion of the pulverizing plate.

The pulverizing cutter may have a reverse trapezoid shape in which a front surface and respective side surfaces are inclined inward.

The food waste treatment apparatus according to the present invention has the following advantages.

First, it has enhanced drying efficiency because microwaves is irradiated on food waste in a direction perpendicular to the food waste, and can reduce costs by decreasing a cycle time.

Second, it is a nature friendly apparatus and maintains a comfortable indoor environment by eliminating odors when it dries food waste.

Third, it can pulverize food waste into a mashed form, and enhance drying efficiency by reflecting microwaves two times in a chamber using a reflection-inducing body and a reflection plate, so that the microwaves head in an upward direction and then a downward direction in the chamber.

BRIEF DESCRIPTION OF THE DRAWINGS

The advantages and features of the present invention may be understood more readily with reference to the accompanying drawings, but the present invention should not be construed as being limited to the accompanying drawings. Further, simple modification and replacement of elements of the present invention may be considered as being included in the scope of the present invention.

DETAILED DESCRIPTION OF THE INVENTION

Hereinafter, a food waste treatment apparatus using microwaves according to the present invention will be described with reference to the accompanying drawings.

Figure 2:
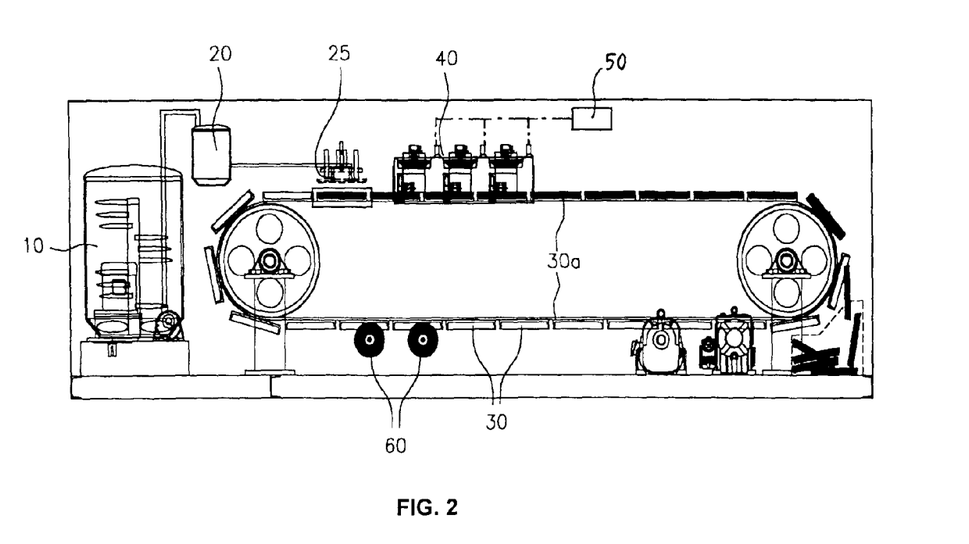
FIG. 2 is a schematic front view illustrating a food waste treatment apparatus according to one embodiment of the present invention.
Figure 3:
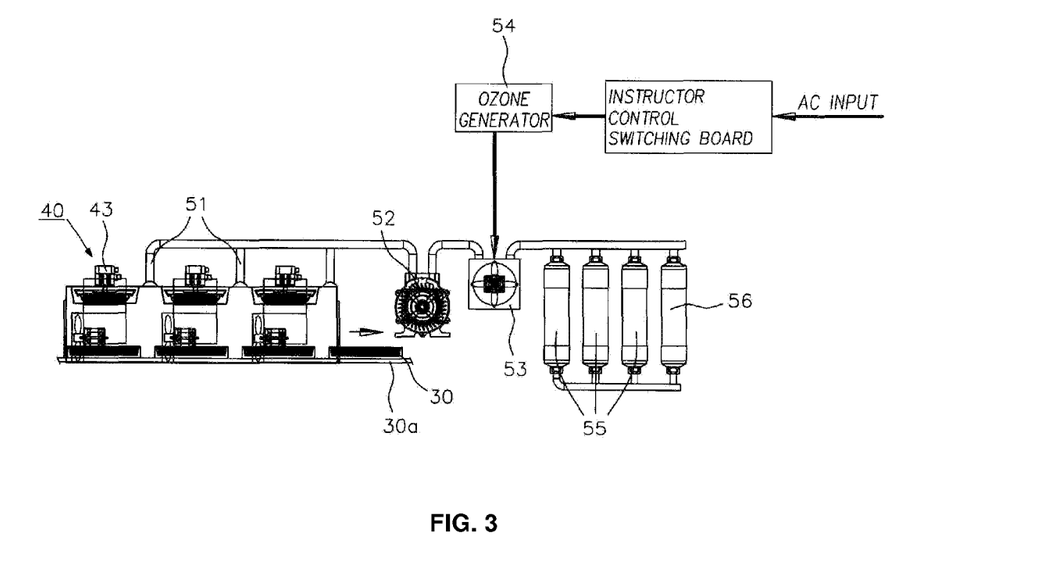
FIG. 3 is a schematic diagram illustrating the combination of a microwave dryer and a post-treatment unit of the food waste treatment apparatus according to the present invention.

FIG. 2 is a front view and FIG. 3 is a schematic diagram illustrating the food waste treatment apparatus according to one embodiment of the present invention.

Referring to FIG. 2 and FIG. 3, the food waste treatment apparatus comprises a pulverizer 10, a quantitative discharger 20, a microwave dryer 40, and a post-treatment unit 50. Food waste is introduced into the pulverizer 10 through an upper part thereof, and is pulverized therein by rotating cutters, so that the food waste is changed into a mashed form.

The mashed food waste is forcedly transferred to the quantitative discharger 20 by a pump, and is discharged at a predetermined rate through a nozzle 25. The pulverizer 10 and the quantitative discharger 20 are selected from the conventional ones, so a description of their details will be omitted.

Referring to FIG. 2, an endless track 30a is installed, and a plurality of the containers 30 is arranged in a row on the endless track 30a. The containers 30 continuously move along with the endless track 30a, and receive and store the mashed food waste discharged from the nozzle 25 of the quantitative discharger 20.

The discharging of the mashed food waste is intermittently performed through the nozzle 25. That is, when one container is disposed under the center of the nozzle, the food waste is discharged into the container from the discharger, and the discharging of the food waste is intercepted while the containers move. The discharging of the food waste can be controlled according to the moving speed of the endless track so that the food waste can be introduced into the containers.

The microwave dryer 40 is installed above the container 30 in a manner such that microwaves reach the surface of the food waste in the container 30 moving in a horizontal direction, in a direction perpendicular to the surface of the food waste, thereby enhancing drying efficiency. If it is needed, a plurality of microwave dryers can be installed in order to more highly enhance the drying efficiency.

Figure 4:
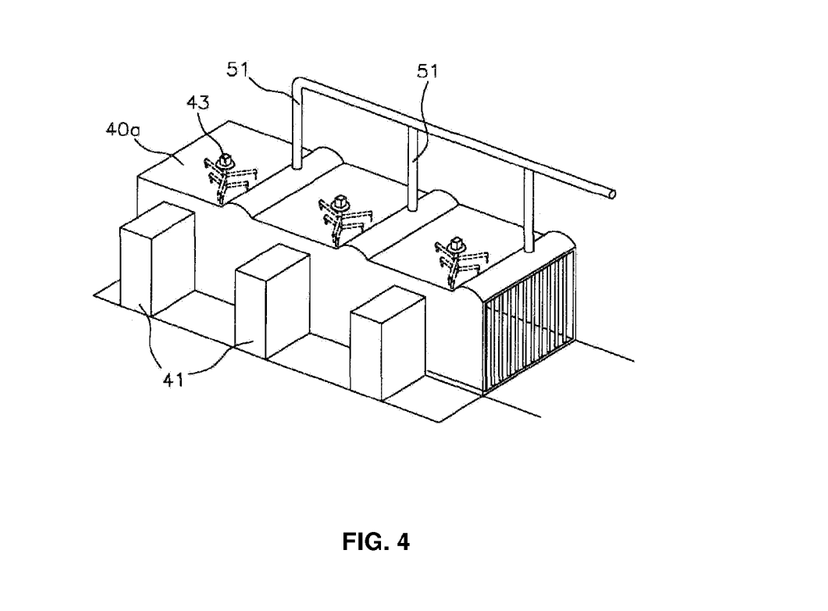
FIG. 4 is a perspective view illustrating the food waste treatment apparatus according to the present invention, in which the microwaves drying unit and the post-treatment unit are integrated into a single body.
Figure 5:
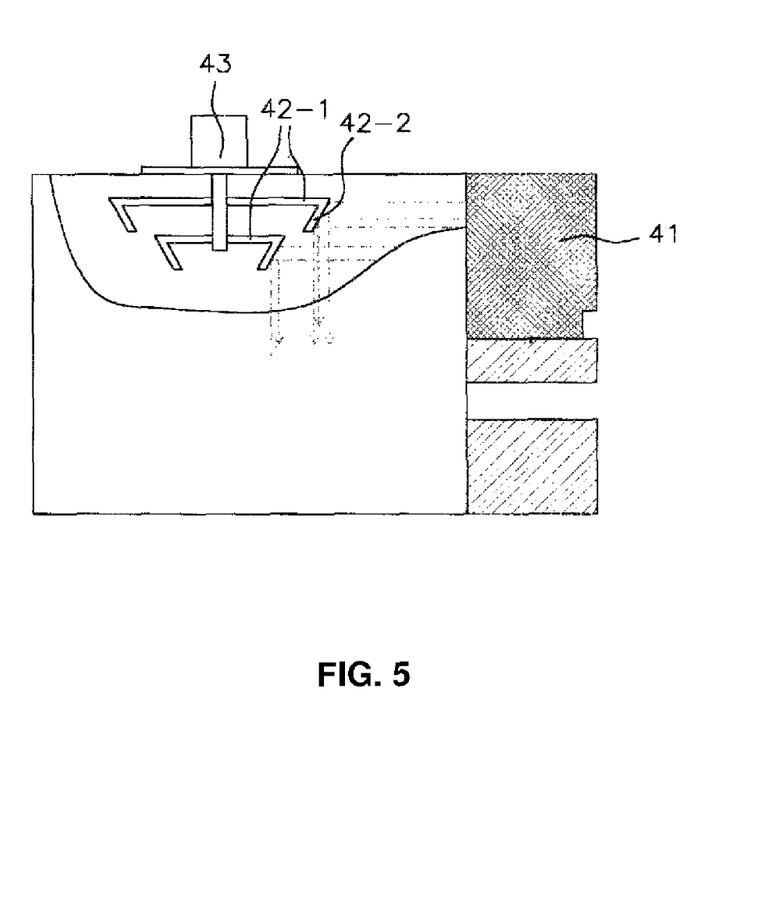
FIG. 5 is a schematic view illustrating the detailed inner structure of the microwaves drying unit.

FIG. 4 illustrates the microwave dryer and FIG. 5 illustrate the inside structure of the microwave dryer.

The microwave dryer 40 includes a magnetron 41 for creating microwaves. The magnetron 41 is a conventional one, so a detailed description thereof will be omitted.

The microwave dryer 40 further includes a reflection means 42 disposed near the magnetron 41. The reflection means 42 is connected to a step motor 43 and is rotated by the step motor 43. The reflection means 42 has a plate 42-2 that is fixed to an edge of an arm 42-1 and inclined inward at 45 degrees from a horizontal direction, so that microwaves created by the magnetron 41 and incident onto the plate 42-2 in a horizontal direction are reflected from the plate 42-2 and then head in a vertical direction after being reflected.

Figure 6:
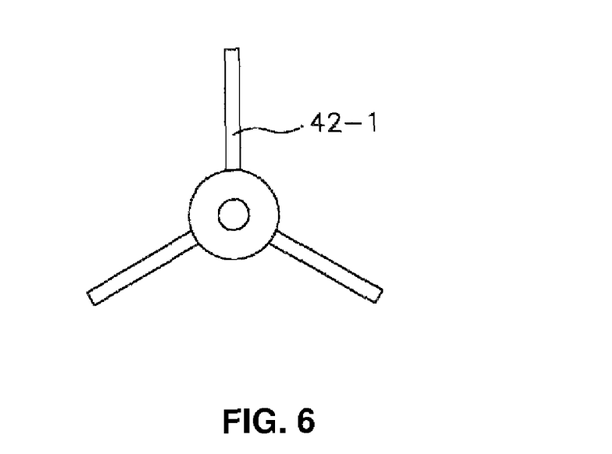
FIG. 6 is a plan view illustrating a reflection means.

FIG. 6 is a plan view illustrating the reflection means. Referring to FIG. 6, the reflection means includes three arms 42-1, each arranged at an angle of 120 degrees. The plates 42-2 are connected to the respective ends of the arms 42-1.

Referring to FIG. 5, the microwave dryer 40 comprises a plurality of pieces of the reflection means 42 connected in series in a vertical direction. According to this embodiment of the present invention, two reflection means 42 having different sizes are installed and are connected to the step motor 43. The ratio of sizes of the two reflection means 42 is preferably 3:2. According to need, three or more reflection means 42 can be included.

Referring to FIG. 4, the microwaves drying unit 40 has a housing 40a having a long tunnel shape, and has three magnetrons 41. In this case, three reflection means 42, corresponding to the three magnetrons 41, are installed in the housing 40a.

The post-treatment unit 50 purifies air by absorbing odors and vapors generated during the drying process performed by the microwave dryer 40.

For post-treatment, a suction duct 51 is connected to the microwave dryer 40, and a suction blower 52 and a mixer 53 are installed. The suction blower 52 sucks odors and mixes the collected odors with ozone. For ozone mixing, an ozone generator 54 is included. As the odors mix with ozone from the ozone generator 54, the odors are preliminary purified.

The odors purified by the mixer 53 and vapors are transferred to a variety of filters 55. Examples of the filters 55 include a carbon filter, a zeolite filter, and a P.P. filter. The numbers and types of the filters vary according to need. The post-treatment unit 50 preferably further includes a condensation means 56 for condensing vapors, thereby separating the vapors from air.

The odor is further purified by the filters 55 and the condensation means 56, so that finally emitted air does not contain hazardous components.

In the case of the tunnel-shape microwave dryer, as shown in FIG. 4, three suction ducts 51 are connected to the housing 40a to eliminate odors.

As shown in FIG. 2, the food waste treatment apparatus according to the present invention, preferably includes one or more rotating brushes 60 under the endless track 30a. The mashed content in the container 30 is dehydrated by the microwave dryer 40 and moves along the endless track 30a, so that the dehydrated food waste is transferred to a separate food waste collection container. Respective empty containers continuously move along the endless track 30a for continuous drying, and are filled with mashed food waste when they are located under the nozzle.

When emptying the containers, there can be residue attached in the bottoms of the containers. Accordingly, the rotating brush 60 is provided to remove the residue from the containers after emptying the containers. The rotating brush removes the residue by brushing the bottom of the container.

The operational principles of the food waste treatment apparatus according to the present invention will be described below.

Food waste is introduced into the pulverizer and is then pulverized in the pulverizer. The pulverized food waste is discharged to the containers disposed under the nozzle using the quantitative discharger and the pump. That is, the containers installed on the endless track are then sequentially filled with the pulverized food waste and move along the endless track, thereby sequentially entering into the microwave dryer. The food waste in the containers is dried rapidly in the microwave dryer. Since a plurality of reflection means is arranged in series, it is possible to enhance the drying efficiency and is possible to continuously dehydrate food waste using containers moving along the endless track.

After the food waste passes out of the microwave dryer, the dehydrated food waste is collected in the separate food waste collection container, and the food waste can be continuously dried as the containers move and enter the microwave dryer continuously.

The odors and vapors generated during the drying process using the microwave dryer are purified by the post-treatment unit and then are discharged into the air.

Figure 7:
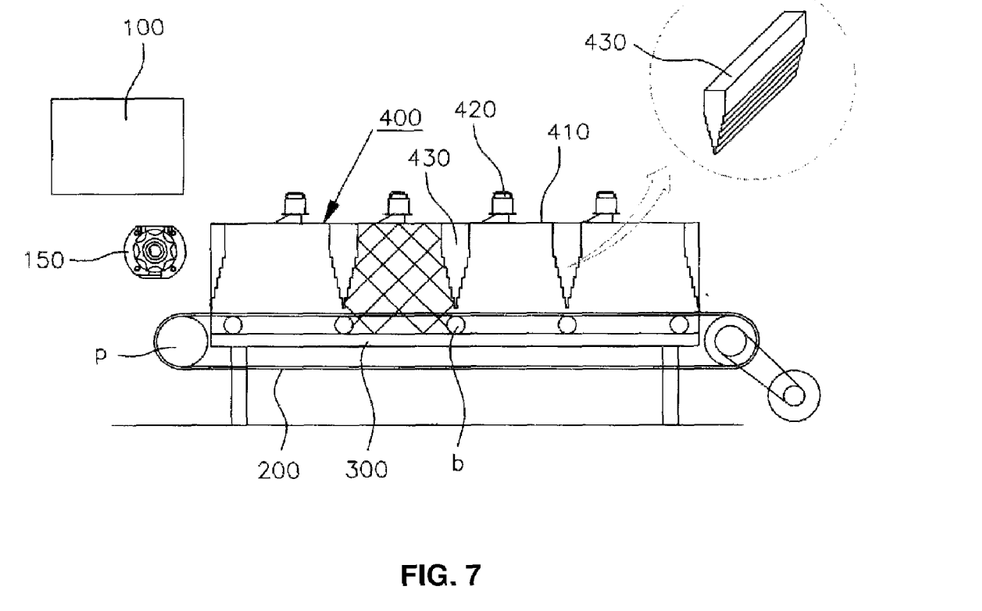
FIG. 7 is a schematic view illustrating a food waste treatment apparatus according to a further embodiment of the present invention.
Figure 8:
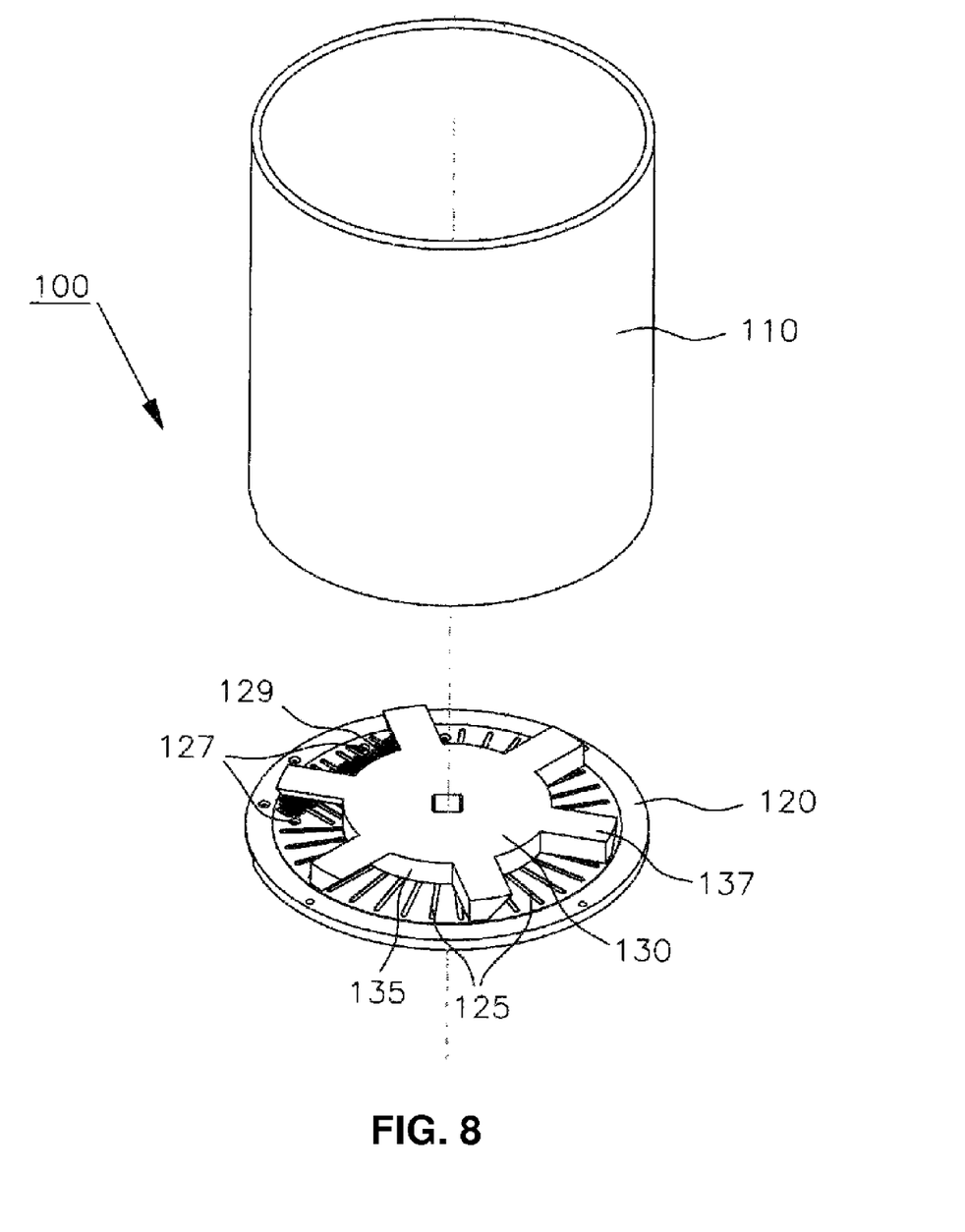
FIG. 8 is an exploded perspective view illustrating the food waste treatment apparatus shown in FIG. 7.

Referring to FIG. 7, a food waste treatment apparatus according to a further embodiment of the present invention will be described. FIG. 7 is a plan view illustrating the food waste treatment apparatus according to this embodiment of the present invention, and FIG. 8 is an exploded perspective view illustrating the pulverizer of this apparatus.

The food waste treatment apparatus according to the further embodiment of the present invention includes a pulverizer 100, an endless track 200, a reflection plate 300, a microwave dryer 400 and a post-treatment unit (not shown). The pulverizer 100 pulverizes the food waste into a mashed form, and discharges the mashed food waste.

The pulverizer 100 includes a cylindrical casing 110 having an open upper end and an open lower end, and a pulverizing plate 120 coupled to the lower end of the cylindrical casing 110. The pulverizing plate 120 has a disk shape, and has depressions 125 formed on an upper surface thereof in a first zone thereof, and has a plurality of through holes 127 in a second zone other than the first zone where the depressions 125 are formed.

As shown in the drawings, the area of the second zone in which the through holes 127 are formed is about a quarter of the entire area of the pulverizing plate 120, and the depressions 125 are formed in the second zone, which occupies three quarters of the entire area of the pulverizing plate 120.

The depressions 125 can be preferably also formed in the second zone between the through holes 127.

More preferably, a screen mesh 129 can be installed on the pulverizing plate 120 in the first zone where the through holes 127 are formed, so that insufficiently pulverized food waste is prevented from being discharged through the through holes 127.

Further, a pulverizing rotary unit 130 is disposed on the surface of the pulverizing plate 120 and a shaft is installed in the center of the pulverizing rotary unit 130 connected to a motor.

The outermost diameter of the pulverizing rotary unit 130 is the same as a diameter of an imaginary circle formed by an imaginary line connecting the depressions 125. A plurality of divided depressions 135 arranged at regular intervals forms protruding pulverizing cutters 137. In this embodiment, there are six cutters.

The pulverizing rotary unit 130 is combined with the pulverizing plate 120 and is distanced from the surface of the pulverizing plate 120, and pulverizes food waste by rotating the pulverizing plate 120.

The front surface and respective side surfaces of the pulverizing cutter 137 incline inward, so that the pulverizing cutter 137 has a reverse trapezoid shape. Since the front end and respective sides of the pulverizing cutter 137 are inclined, food waste can more easily pass between the cutters 137, so that the food waste can be more thoroughly pulverized.

The food waste pulverized by the pulverizer 100 is discharged through the through holes 127, and a food waste feeder 150 is installed under the through holes 127. The feeder 150 is a rotating body having a plurality of depressions formed at regular intervals. The food waste is introduced into the depressions, and is then rotated by the rotating body. The food waste falls down, and is finally scattered on the surface of the endless track.

The endless track 200 engages with a pulley P so that it can move endlessly.

The endless track 200 is made of material through which microwaves can penetrate and which can endure a high temperature of about 800 to 900° C. For example, the endless track 200 is made of a fabric woven with silicon dioxide fiber, or with glass fiber.

The endless track 200 may be coated with a silicon layer on the surface thereof. Thanks to the silicon layer, the dried food waste is more easily pulverized.

The reflection plate 300 is installed in a space provided by the endless track 200 in a manner such that it is separated from the endless track 200 and is not in contact with the endless track 200. The reflection plate 300 may be a metal plate. The distance between the surface of the reflection plate and the endless track can be adjusted according to need.

A plurality of bars b is arranged on the surface of the reflection plate 300 at regular intervals in a length direction, in a manner such that the bars b are not in contact with the inner surface of the endless track and cannot be loosened in the vertical direction.

The microwaves drying unit 400 is installed above the endless track 200 and includes a magnetron that creates microwaves and radiate the microwaves in the vertical direction.

The microwaves drying unit 400 includes a chamber 410, a magnetron 420, and a reflection-inducing body 430. The chamber 410 is installed above the endless track 200, is connected to the reflection plate 300, and has an empty space therein.

The magnetron 420 is installed above the chamber 410, generates microwaves and radiates them into the chamber 410. The plurality of reflection-inducing bodies 430 is installed in the chamber 410 at an upper part thereof between the plurality of magnetrons 420.

Each of the reflection-inducing bodies 430 has a shape in which the thickness thereof decreases from an upper part to a lower part. According to this embodiment, the reflection-inducing body 430 is formed in a stepwise shape, and has a sharp lower end. Thanks to the above-described structure of the reflection inducing body, the total surface area of the reflection-inducing body increases, thereby enhancing the microwave reflection efficiency.

Thanks to variation of thickness of the reflection-inducing body, a dead zone, which microwaves do not reach, does not exist.

The microwaves created by the magnetron 420 are reflected from the reflection-inducing bodies 430, head in the downward direction, pass through the endless track 200, are reflected again from the surface of the reflection plate 300, and head in an upward direction, thereby drying the food waste on the endless track with high drying efficiency.

The odors and vapors produced from the pulverized food waste and dried by the microwaves are removed by the post-treatment unit (not shown). The post-treatment unit in the apparatus according to this embodiment is the same as that in the apparatus according to the previously described embodiment. The odors and vapors are collected through a duct connected to the chamber, and a detailed description thereof will be omitted.

INDUSTRIAL APPLICABILITY

The food waste treatment apparatus according to the present invention has high drying efficiency, thereby being capable of being used widely in houses and restaurants. The food waste treatment apparatus according to the present invention can be used as a sludge dehydration apparatus.

What is claimed is:
1. A food waste treatment apparatus using microwaves, comprising:
  a pulverizer for pulverizing food waste;
  a quantitative discharger disposed at a downstream location of the pulverizer for discharging the pulverized food waste through a nozzle at regular discharge rates;
  a plurality of containers installed on an endless track for receiving and transferring the pulverized food waste discharged from the quantitative discharger;
  a microwave dryer installed above the endless track for drying the pulverized food waste, the microwave dryer having a plurality of magnetrons installed in series along the endless track to radiate microwaves towards the pulverized food waste contained in the containers; and
  a post-treatment unit connected to of the microwave dryer, the post-treatment unit including a plurality of suction ducts connected to the microwave dryer to discharge air, vapor, and odor from the microwave dryer, each suction duct disposed at a downstream location of its corresponding one of the plurality of magnetrons, an ozone generator for producing ozone, a mixer for mixing the air, vapor, and odor taken from the microwave dryer through the suction ducts with the ozone produced by the ozone generator to remove the odor, and a plurality of filters for purifying the air, vapor, and odor before discharging to the outside.

2. The food waste treatment apparatus according to claim 1, wherein the microwave dryer comprises:
  a reflection means for reflecting the microwaves incident in a horizontal direction into a downward direction, the reflection means including a first set of fixed plates arranged in a circle with a first radius and each inclined at 45 degrees with respect to the horizontal direction and a second set of fixed plates arranged in a circle with a second radius, which is smaller than the first radius, and each inclined at 45 degrees with respect to the horizontal direction, the first and second sets of fixed plates rotatable together by a motor.

3. The food waste treatment apparatus according to claim 2, wherein the first and second sets of fixed plates of the reflection means have different sizes whose ratio is 3:2.

4. The food waste treatment apparatus according to claim 1, wherein the microwave dryer has a housing in a tunnel shape, three reflection means installed in the housing, and three magnetrons each coupled to its corresponding reflection means.

5. The food waste treatment apparatus according to claim 4, wherein the housing has respective shielding doors at an entrance side and an exit side thereof, thereby shielding the microwaves and preventing the microwaves from leakage.

6. The food waste treatment apparatus according to claim 1, further comprising a rotating brush installed under the endless track for removing residue attached to an inner surface of the containers.

* * * * *